H. E. MILLER.
DEVICE FOR SUPPORTING CONTAINERS.
APPLICATION FILED FEB. 20, 1912.

1,045,870.

Patented Dec. 3, 1912.
2 SHEETS—SHEET 1.

Witnesses

Inventor
Harry E. Miller
By Victor J. Evans
Attorney

H. E. MILLER.
DEVICE FOR SUPPORTING CONTAINERS.
APPLICATION FILED FEB. 20, 1912.
1,045,870.
Patented Dec. 3, 1912.
2 SHEETS—SHEET 2.
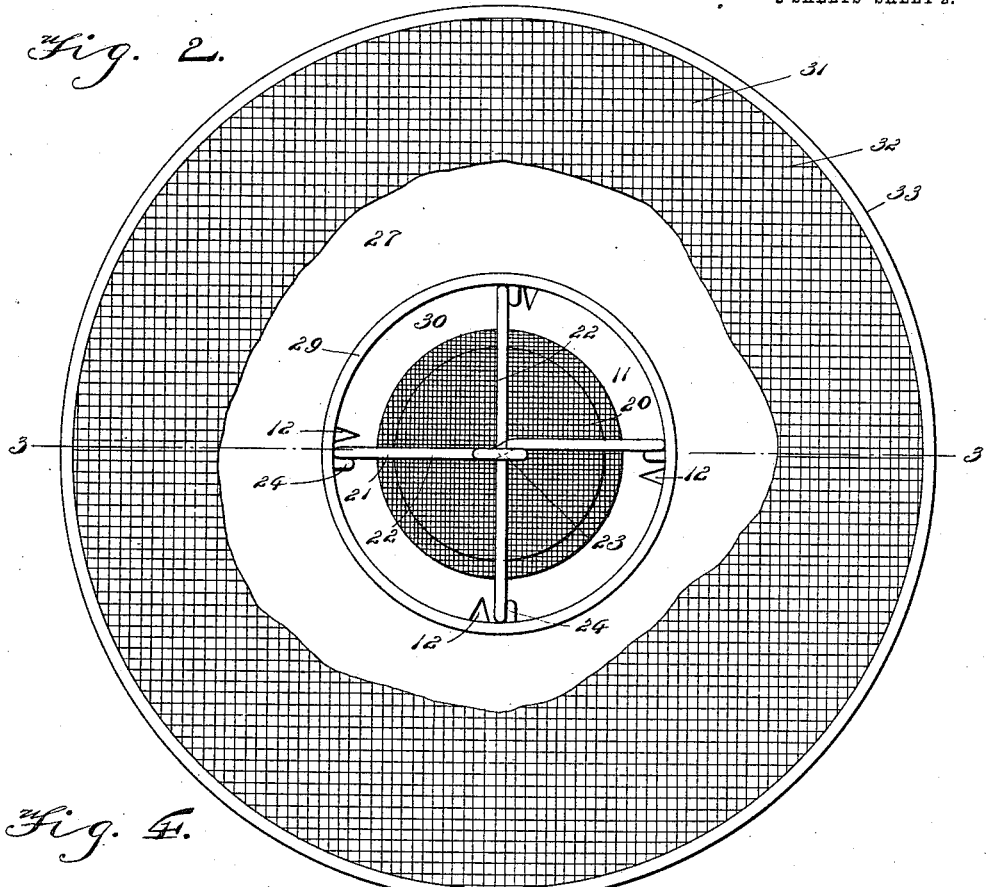
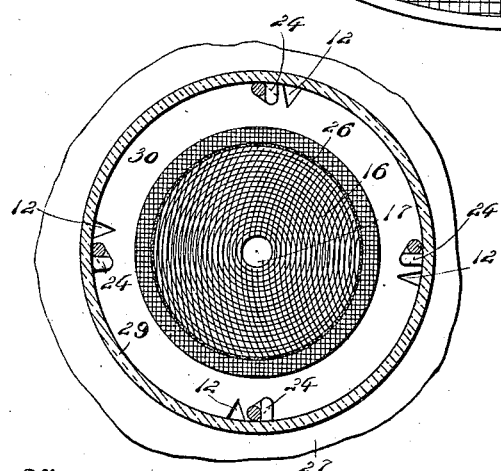
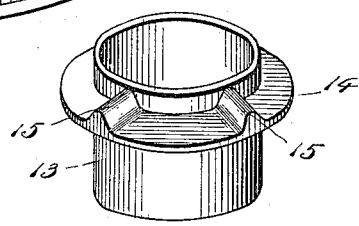
Witnesses
C. E. Kemper.
Inventor
Harry E. Miller.
By Victor J. Evans
Attorney

UNITED STATES PATENT OFFICE.

HARRY E. MILLER, OF CHICAGO, ILLINOIS.

DEVICE FOR SUPPORTING CONTAINERS.

1,045,870.  Specification of Letters Patent.  Patented Dec. 3, 1912.

Application filed February 20, 1912. Serial No. 678,784.

*To all whom it may concern:*

Be it known that I, HARRY E. MILLER, a native-born citizen of the United States, residing at Chicago, in the county of Cook and State of Illinois, have invented new and useful Improvements in Devices for Supporting Containers, of which the following is a specification.

An object of the invention is to provide a device for supporting a plurality of containers.

The invention embodies more particularly a frame for locking engagement with a supporting member adapted to support a container or plurality of containers and retain said container or containers in rigid position relatively to the said supporting member, the said frame being arranged to support an independently removable container.

My device is preferably adapted for use in connection with flowers or plants, the outer container, supported by the frame being adapted to constitute a receptacle for the reception of flowers or ferns, a second container constituting a bait container being arranged upon the supporting member and having mounted thereon a trap member rigidly supported on the bait container by the said frame, the mentioned bait container and trap body being provided to receive insects that usually inhabit flowers, such as ferns and the like.

In the further disclosure of the invention, reference is to be had to the accompanying drawings constituting a part of this specification, in which similar characters of reference denote corresponding parts in all the views, and in which—

Figure 1:
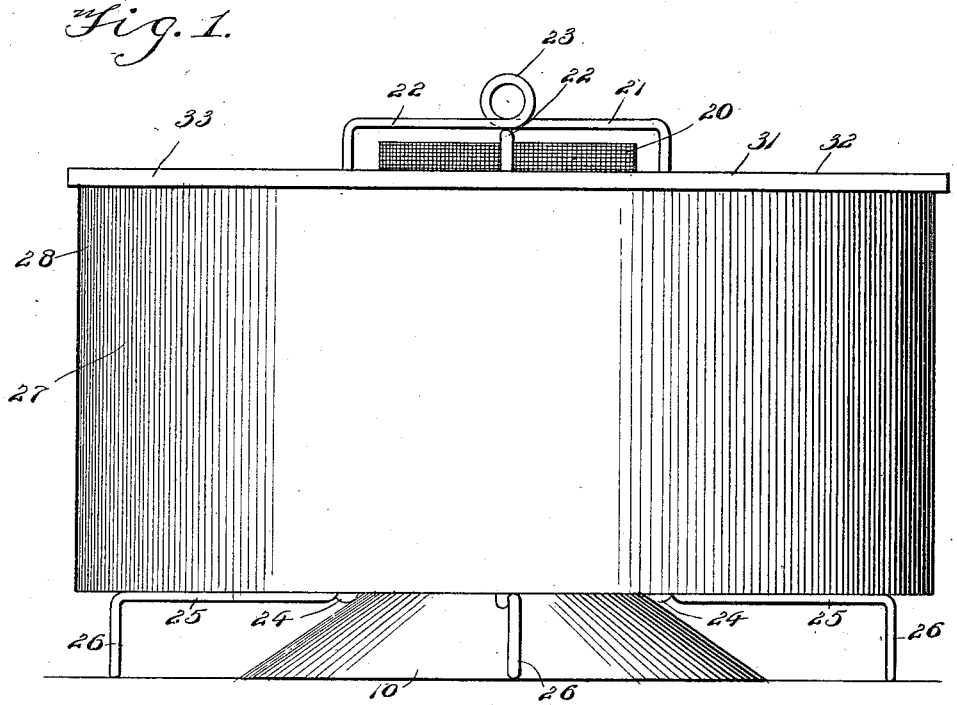
Figure 3:
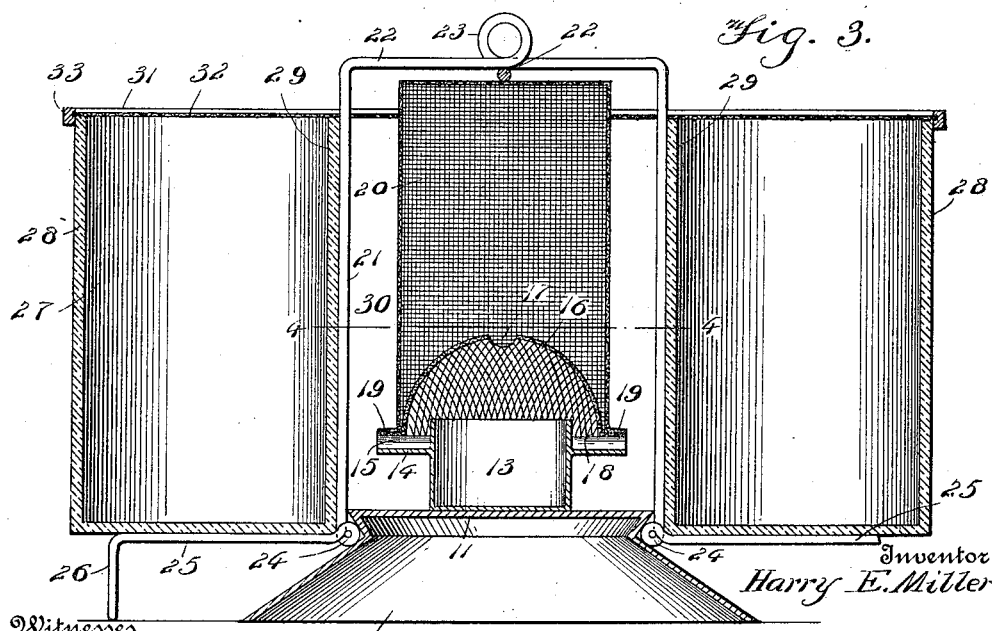

Figure 1 is a side elevation of the device. Fig. 2 is a plan view. Fig. 3 is a vertical sectional view taken on the line 3—3 in Fig. 2. Fig. 4 is a horizontal sectional view taken on the line 4—4 in Fig. 1. Fig. 5 is a perspective view of the bait container.

Referring more particularly to the views, use is made of a frusto-conically shaped supporting member 10 provided at the upper end thereof with an inclined locking flange 11 having a series of grooves 12 formed in the periphery thereof, a bait container 13 being mounted on the upper plain surface of the supporting member 10, the mentioned bait container being provided with a lateral flange 14 arranged to encircle the bait container 13 below the upper edge thereof, the mentioned flange 14 being provided with a series of spaced supporting lugs 15. Mounted to repose upon the supporting lugs 15 is an inverted bowl-like container 16, the said container being preferably formed of screen wire and provided with a central aperture 17, the lower edge of the container 16 being spaced from the flange 14 by the supporting lugs 15 to provide openings 18 between the supporting lugs, the mentioned lower edge of the container 16 terminating in a horizontally extending circular flange 19. Supported by the flange 19 of the container 16 is a vertically extending container 20 adapted to form a trap with the container 16 as will be hereinafter more fully disclosed, the mentioned container 20 being retained in rigid supporting position on the flange 19 of the container 16, by a spider frame 21, preferably consisting of spring like wire members 22 extending diagonally across the top of the container 20 and soldered together at their points of intersection, an eye 23 being formed by bending one of the members 22 at the point of intersection with the other member, the mentioned members being then bent to extend downwardly adjacent the outer side of the container 20 and then bent to form locking members 24, the mentioned members 22 being then bent diametrically outward to form a supporting base 25, the extremities of the said members being bent downwardly to form legs 26, as shown, a container 27 being mounted to repose upon the base 25 formed by the diametrically extending portions of the members 22, the said container 27 comprising an outer wall 28 and an inner wall 29 spaced from the outer wall 28 to form a compartment, the mentioned container 27 being circular in shape to provide a central opening 30 through which the spider frame 21 extends, the containers 13, 16 and 20 being encircled by the container 27 and spaced therefrom with portions of the spider frame interposed between the container 27 and the container 20 as shown.

As mentioned heretofore the members 22, constituting the spider frame 21, are formed of a spring like wire and to retain the container 20 in rigid supporting position, when the spider frame is mounted to engage the supporting member 10, the locking members 24 of the spider frame are sprung into the grooves 12 of the inclined locking flange 11 after which the supporting member 10 is slightly turned so that the locking members 24 will be moved out of register with the grooves 12 and will lie beneath the inclined locking flange 11, thus locking the container 20 to the container 16, which in turn is held in locked supported position on the supporting lugs 15 of the container 13, the positioning of the locking members 24 beneath the inclined locking flange as mentioned being also adapted to support the spider frame 21 to permit of mounting the outer container 27 in supporting position upon the spider frame.

Assuming that the container 27 is to be used as a fern dish, when the various parts of the device have been assembled and mounted as mentioned, a bait having been previously placed in the container 13, any insects that may have inhabited the ferns will be attracted by the bait in the container 13 and will pass into the container through the openings 18 and after the insects have partaken of the bait and attempted to remove themselves from the container 13, instead of passing out through the openings 18, the insects will crawl or fly upwardly into the container 16, forming a top for the container 13 and will then pass through the aperture 17, into the container 20 from which they will be unable to escape except through the aperture 17. It is well known, however, that insects such as flies or bugs naturally crawl in an upward direction and thus it is obvious that the insects cannot readily escape through the aperture 17. It will be seen that when the container 27 is used as a fern dish or the like, the trap container 20 will be almost hidden from view and when it is desired to remove the trapped insects from the container 20, the container 27 is first lifted from the supporting base 25 of the spider frame, after which the remainder of the device can be immersed in water to kill the insects, the spider frame being then removed out of locked engagement with the supporting member 10 to permit of removing the container 20 and extracting the dead insects therefrom.

When it is desired to use the container 27 as a receptacle for cut flowers, a cover 31 can be employed to encircle the upper end of the container 27, the mentioned cover consisting wire having a large mesh with the edges of the top secured to a circular band 33 arranged to extend around the upper end of the container 27 when the cover 31 is mounted in position thereon, the stems of the cut flowers being passed through the openings formed by the large meshed wire. It will be understood however, that the cover 31 is not an essential part of the device and that the device can be used for cut flowers or otherwise, regardless of the cover.

From the foregoing description, it will be seen that the supporting member 10, aside from supporting a plurality of containers, aids in supporting the spider frame 21 which, mounted in locking engagement with the supporting member 10 retains the containers 13, 16 and 20 in relatively rigid position, the container 27 being supported by the supporting base 25 of the spider frame 21 and mounted to encircle the trap container 20 so that when flowers are placed within the container 27, the trap container will be almost hidden from view. My device can be conveniently mounted in suspended position by securing the lower end of a chain, attached to the ceiling, to the eye 23 of the spider frame 21.

I claim:—

In combination with a supporting member, a bait container mounted thereon, a second container mounted on the said bait container, a trap container mounted on the said second container and a spider frame adapted for engagement with the trap container and having locking engagement with the said supporting member to retain the said trap container in rigid position relatively to the said supporting member.

In testimony whereof I affix my signature in presence of two witnesses.

HARRY E. MILLER.

Witnesses:
CHAS. F. BARTH,
DANIEL ZINSER.

Copies of this patent may be obtained for five cents each, by addressing the "Commissioner of Patents. Washington, D. C."